United States Patent

[11] 3,563,375

[72] Inventor Dominique Robert
    Vincennes, Val-de-Marne, France
[21] Appl. No. 747,818
[22] Filed July 26, 1968
[45] Patented Feb. 16, 1971
[73] Assignee Societe de Produits
    Chimiques D'Auby, Neully-sur-Seine,
    France
[32] Priority Aug. 8, 1967
[33] France
[31] 117,154

[54] METHOD OF SELECTIVELY SEPARATING SOLID PARTICLES BY ELECTROSTATIC SORTING IN FLUIDIZED BED
10 Claims, No Drawings

[52] U.S. Cl ............................................. 209/9,
    117/17, 117/27, 117/100, 117/123, 117/161,
    209/127
[51] Int. Cl ......................................... B03b 1/00,
    B03c 7/02
[50] Field of Search ............................... 117/100,
    123, 161, 27, 17; 209/9, 127

[56] References Cited
UNITED STATES PATENTS

| | | | |
|---|---|---|---|
| 2,618,551 | 11/1952 | Walkup ...................... | 117/100X |
| 2,694,688 | 11/1954 | Hughes ....................... | 117/161 |
| 2,948,632 | 8/1960 | Albert et al. ................. | 117/100X |
| 3,024,209 | 3/1962 | Ferrigno ..................... | 117/100X |
| 3,164,481 | 1/1965 | Shibe ......................... | 117/123X |
| 3,206,328 | 9/1965 | Shaw et al. .................. | 117/161X |
| 3,225,924 | 12/1965 | Autenrieth et al. ........... | 209/9 |
| 3,226,784 | 1/1966 | Owen et al. .................. | 117/100X |
| 3,248,253 | 4/1966 | Barford et al. ............... | 117/100X |
| 3,274,298 | 9/1966 | Massengale et al. .......... | 117/161X |
| 3,312,640 | 4/1967 | Ferrigno ..................... | 117/100X |
| 3,420,703 | 1/1969 | Kirkschnek .................. | 117/138.8X |
| 3,217,876 | 11/1965 | Autenrieth ................... | 209/127X |
| 3,401,795 | 9/1968 | Tauveron ..................... | 209/127X |
| 3,388,794 | 6/1968 | Peuschel ...................... | 209/9 |
| 3,356,521 | 12/1967 | Boltniew ...................... | 117/27 |

FOREIGN PATENTS

| | | | |
|---|---|---|---|
| 921,032 | 3/1963 | Great Britain ................ | 117/100 |

Primary Examiner—William D. Martin
Assistant Examiner—Mathew R. P. Perrone, Jr.
Attorney—Stevens, Davis, Miller & Mosher ABSTRACT: Separation of particles is obtained by applying a cationic surface-active coating to the particles fluidizing the coated particles, and subjecting the fluidized coated particles to the action of an electrostatic-field-type separation.

METHOD OF SELECTIVELY SEPARATING SOLID PARTICLES BY ELECTROSTATIC SORTING IN FLUIDIZED BED

It has been known for a long time to selectively separate various solid particles by the so-called electrostatic sorting method.

It has also been proposed, in operations of this character, to perform a preliminary conditioning of the mineral particles to be separated, by using chemicals specific to certain applications, for example by activating the separation of diamonds by means of NaCl, etc.

The use of surface-active agents for the conditioning of ores to be separated or enriched by means of electrostatic treatments has also been proposed beforehand.

However, up to now the possibility of producing by electrostatic separation the direct, systematic activation or depression, on a fluidized bed, of the mass of treated particles by incorporating therein one or more substances capable of exerting surface-active effects on the particles to promote the separation thereof, has not been contemplated.

In fact, this is an extremely particular and complicated problem for in particular the absorption of the reagents on the particle surface will alter some of the physical characteristics controlling the behavior of the substances in the sorting apparatus (readsorption of the surrounding humidity, surface conductibility, triboelectrical effect, etc.).

Therefore, this problem cannot be solved satisfactorily, according to this invention, unless the introduction of the reagents and the production of the electrostatic effects, notably the triboelectric effect, are carried out concomitantly, and unless a fluidized bed is used.

According to this invention it was found that the activating or depressing surface-active substances are in many applications advantageously nonanionic and preferably cationic.

The cationic surface-active substances advantageously used according to this invention are selected preferably from the amine or polyamine group, more particularly the group of primary amines (or their derivatives), these primary amines corresponding to the general formula:

$$R\text{-}NH_2 \quad (1)$$

wherein R is a radical comprising 8 to 22, and preferably from 12 to 18 carbon atoms.

Among the amine derivative products thus used as activators or depressors in the electrostatic sorting of solid particles in a fluidized bed, the following ones may also be cited by way of examples:

a. amine salts, more particularly acetates, according to the following known general formula:

$$R\text{-}NH_3\text{-}OOC\text{-}CH_3 \quad (2)$$

b. amino acids consistent with the known general formula:

$$R\text{-}NH\text{-}CH_2\text{-}CH2\text{-}COOH \quad (3)$$

or $\quad R\text{-}NH\text{-}CH_2\text{-}CH2\text{-}COOMe\ 2\text{-}COOMe \quad (4)$ c. quaternary ammonium salts according to the known general formula:

(5)

wherein $R_1$ and $R_2$ are radicals varying within the same limits as the radical R of the preceding formulas.

d. oxyethylated amines obtained by condensing ethylene oxide over a primary, fatty amine chain according to the general formula:

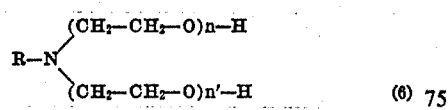

(6)

wherein $n$ and $n'$ designate integers of which the sum advantageously varies from 2 to 15.

e. cationic products obtained by condensing fatty acids and short-chain polyamines (such as amido-amines, imidazolines and their derivatives) corresponding more particularly to the following general formulas:
1. amido-amines and their derivatives (acid salts, quaternary ammonium salts, oxyalkylated derivatives, amphoteric derivatives, etc.)

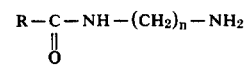

wherein R is an alkyl radical comprising 8 to 22 carbon atoms, and $n$ is an integer from 1 to 18.

2. Imidazolines and their derivatives (acid salts, quaternary ammonium salts, oxyalkylated derivatives, amphoteric derivatives, etc.).

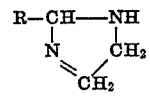

wherein R is an alkyl radical comprising 8 to 22 carbon atoms.

f. The amphoteric products corresponding to the following general formula:

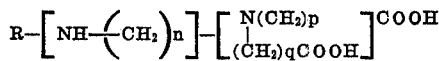

wherein R is an alkyl radical comprising 8 to 22 carbon atoms, $n$, $p$ and $q$ denoting integers ranging from 1 to 6.

The percentage of surface-active product of products thus introduced varies according to the specific applications contemplated, but apparently the best results are obtained as a rule in a percentage range from 20 to 1,000 g. of cationic surface-active product per ton of treated solid materials.

The separation may be obtained according to cases, as already known, either by adherence above the bath or to the underface of a movable electrode (conducting rubber belt), or with a rapid or slow outward fall, with the additional advantageous possibility of separating two bodies extracted simultaneously from the fluidized bed.

It is thus possible, by properly selecting the treatment reagent or reagents, to perform separations of which some are sometimes considered as impossible by applying other techniques such as flotation, gravimetry, magnetic separation, or the electrostatic separation without a preliminary conditioning.

The following table illustrates by way of examples the results of a few tests carried out with different materials to be separated.

In these examples, the reagent proportion was 500 g./ton in a 5 percent aqueous solution.

The following seven aminated reagents have been used:
A. amine acetate as per the above formula (2), wherein R ranges from 8 to 18 carbon atoms;
B. A reagent consisting of a mixture in equal proportions of a diamine as per formula (1), wherein R = 16 to 18 carbon atoms, and an oxyethylated amine according to formula (6) wherein R = 16 to 18 carbon atoms and $n+n' = 11$;
C. Amino acid as per formula (4) wherein R = 8 to 18 carbon atoms and Me is Na;
D. Quaternary ammonium salt as per formula (5), wherein $R_2$ consists of $CH_2\text{-}C_6H_5$;
E. Quaternary ammonium salt as per (5) wherein $R_1 = R_2 =$ 8 to 18 C;
F. Oxyethylated amine according to formula (6), wherein R = 16 to 18 C and $n+n' = 11$;
G. Oxyethylated amine as per (6), wherein R = 16 to 18 C and $n+n' = 7$.

The results are expressed in the form of symbols or indicia having the following meanings:

0 = no extraction for the movable electrode;
1 = low extraction rate (less than 5 g. in 15 sec., rather detrimental to selectivity);
2 = Extraction intensity ranging from 5 to 15 g. in 15 sec.;
3 = Extraction intensity ranging from 15 to 25 g. in 15 sec.;
4 = Extraction intensity greater than 25 g. in 15 sec. (from a load disposed in a container having a diameter of 13 cm).

The symbols 1, 2, 3 and 4 are associated with:

a vertical, upwardly-directed arrow↑ (1↑, 2↑, 3↑, 4↑)if an intense adherence to the underface of the movable electrode is produced;

a vertical, downwardly-directed arrow↓ (1↓, 2↓, 3↓, 4↓) if the extraction attended by an adherence to the underface of the electrode as per the preceding case is followed by a quick fall, but nevertheless with an extraction from the bath (possibility of sorting the particles);

Similarly, the symbols 1, 2, 3 and 4 are associated with a horizontal arrow → (1 →, 2 →, 3 →, 4 → ) in case of extraction on a lateral electrode.

F denotes a "coagulation" of the bath, a specific, known effect corresponding to a critical conductivity zone.

TABLE

|  | Reference Test | | A | B | C | D | E | F | G |
|---|---|---|---|---|---|---|---|---|---|
|  | Without heating without reagent | With heating without reagent | | | | | | | |
| Quartz, $SiO_2$ | 2↑ | F | 3↑ | 2↑ | 3↑ | 2↑ | | | |
| Potassium Feldspar, $6 SiO_2Al_2O_3K_2O$ | 2↑ | F | | 3↑ | | 3↑ | | 4↑ | |
| Gypsum, $CaSO_4 2H_2O$ | 0 | 1↑ | 3→ | 4↑ | 4↑ | 1→ | 3→ | 4↑ | 7↑ |
| Barite, $BaCO_3$ | 0 | F | 2↑ | 2↑ | 3↑ | F | | | |
| Calcite, $CaCO_3$ | 0 | 2↑ | 2↓ | 2↓ | 2↓ | | | 2↓ | 3↓ |
| Rhodochrosite, $MnCO_3$ | 0 | 1↑ | F | F | F | | | 2↓ | 3↓ |
| Rhodonite (pyronene with Mn) $SiO_2MnO$ | 0 | 1↓ | 1↓ | 1↓ | 2↓ | F | 3→ | 0 | 1↓ |
| Lepidolite (Lithium mica) $2 SiO_2 Al_2O_3 Li_2O$ (Theoretical) | 0 | F | | | 3↑ | | | | |
| Chrysocolla, $SiO_2Cu2H_2O$ (Theoretical) | F | F | 3→ | F | | 2→ | | | |
| Fluorite (Fluor Spart) $CaF_2$ | 3↑ | 4↑ | 2↑ | 4↑ | 3↑ | 3↓ | 0 | 0 | 3↓ |

From this table it will be seen that some (very few) of the separations thus performed can be accomplished in the absence of a preliminary conditioning. Moreover, triboelectricity effects caused by ore mixtures are such that each ore constitutes a specific case in which the results obtained with pure minerals may undergo modifications.

In any case, two very definite advantages are provided by the preliminary conditioning: firstly, an accentuation of the differences in behavior of the sorted particles, and secondly and more particularly the possibility of operating after cooling to room temperature, irrespective of the hygrometric degree of the atmospheric air.

On the other hand it is quite possible that the readsorption, whether retarded or accelerated by the presence of the reagent and of atmospheric moisture, is not extraneous to the effects observed during these tests.

It is obvious that the trend towards the electrostatic separation in a fluidized bed, after a preliminary conditioning of the material, is subordinate first of all to the structure of the mineral or other substance to be treated. But even by admitting the fact that the requirement for releasing the component elements are properly met, the following advantageous features will be recorded according to cases in comparison with other known processes, especially flotation, with due regard for the inconvenience of drying steps:

the elimination of costly reagent formulas,
a simplification in the equipment and circuits thereof,
a lower water consumption,
a wider granulometry range (40 to 500 $\mu$),
a more convenient handling and delivery of the products, and
more particularly, the possibility of performing certain separation heretofore unattainable or very difficult.

According to another exemplary application of this invention, an ore consisting of microcline (potassium feldspar) and ferruginous grains assaying 2.5 percent of $Fe_2O_3$ is treated. This ore is ground to 500 $\mu$ particle size and slime is removed therefrom to reduce its particle size to 50 $\mu$ by using conventional means. A 1-kg. load is introduced into a 2.5-liter conditioner together with 1 liter of ordinary water. The rotary agitator is driven at 1,100 r.p.m. in order to put the sand in complete suspension. Then 500 g./ton of the above-mentioned reagent B are added; the conditioning step is carried out during 3 min. The sand is then filtered and dried. The sand is subsequently fed in the cold state to the fluidized-bed separator operating under conventional tension and wind conditions. A microcline having a $Fe_2O_3$ content inferior to .05 percent is eventually extracted therefrom.

According to another example, an ore consisting of 42 percent quartz and 58 percent sodium feldspar is treated. The component elements are practically released by grinding to 400 $\mu$ particle size. A conditioning operation carried out as per above but by using a reagent according to the above formula B produces a sand which, when fed to the fluidized bed separator, is divided into two subproducts having less than 5 percent impurities.

Finally, according to a last example, an ore containing pyrochlore (.5 percent), sulfides, magnetite, apatite, some mica (8.5 percent) and calcite (91 percent) is treated. This ore is preliminarily conditioned under the same conditions as set forth hereinabove, but 500 g./ton of reagent A are used. The separation in the fluidized bed permits of obtaining an extract consisting of $CaCO_3$ (99 percent) and $Cb_2O_5$ (.05 percent), corresponding to a 96 percent calcite elimination. The extraction kinetics is strongly improved by performing the separation in a heated state (70° C).

Of course, the ores and substances mentioned hereinabove in the description of practical embodiments of the process of this invention should not be construed as limiting the invention for it would not constitute a departure therefrom to modify in any suitable manner the number, characters (ionic or else), proportions, possible mixtures, origins, pH number, etc. of the surface-active substances, according to the type of materials to be treated, as well as the technical operating conditions.

The apparatus utilized for carrying out the method of this invention may consist of conventional containers for stirring the materials in the liquid phase. Certain conditioning steps may also be carried out in the heated state by atomizing the reagents or evaporating the solvent inside the drying apparatus itself.

The present invention also includes, by way of novel industrial products, the treatment products, notably their mixtures and solutions, as well as the products obtained and separated by carrying out the method of this invention, and also the specific apparatus for carrying out this method.

I claim:

1. A method for selectively separating solid mineral particles consisting of coating said particles with a cationic surface-active substance promoting selectivity in an amount of from 20 to 1,000 grams per ton of treated solid mineral particles, fluidizing said coated particles and submitting said fluidized particles to the action of an electrostatic field type separator.

2. Method according to claim 1, wherein the cationic surface-active substance is selected from the group consisting of amines, polyamines, and derivatives thereof and mixtures of at least two of said amines, polyamines and derivatives.

3. Method according to claim 2, wherein said amines are primary amines of the formula:

R-NH$_2$ wherein R is a radical having 8 to 22 carbon atoms.

4. Method according to claim 3, wherein R has 12 to 18 carbon atoms.

5. Method according to claim 2, wherein said amine derivatives are selected from the group consisting of:
  a. amine salts of the formula:

R-NH$_3$-OOC-CH$_3$ b. amino-acids of the formula:

R-NH-CH$_2$-CH2-COOH c. quaternary salts of the formula:

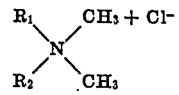

wherein R$_1$ and R$_2$ are radicals having 8 to 22 carbon atoms;
  d. Oxyethylated amines obtained by the condensation of ethylene oxide over a fatty-amine primary chain of the formula:

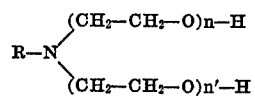

wherein n and n' designate integers, the sum of which is between 2 and 15;
  e. amphoteric products corresponding to the following general formula:

wherein R is an alkyl radical comprising 8 to 22 carbon atoms and n, p and q are integers ranging from 1 to 6.

6. Method according to claim 5, wherein a is an acetate.

7. Method according to claim 2, wherein said amine derivatives are amino acids of the formula:

R-NH-CH$_2$-CH2-COO Me wherein Me is a metal.

8. Method according to claim 2, wherein said amine derivatives are obtained by the condensation of fatty acids and short-chained polyamines, said short-chained polyamines being selected from the group consisting of amido-amines, imidazolines and derivatives thereof.

50 Method according to claim 8, wherein said derivatives of amido-amines are selected from the group consisting of acid salts, quaternary ammonium salts, oxyalkylated derivatives and amphoteric derivatives, the formula of said amido-amines being:

R-C-NH-(CH$_2$)n-NH$_2$ wherein R is an alkyl radical comprising from 8 to 22 carbon atoms and n is an integer ranging from 1 to 8.

10. Method according to claim 8, wherein said derivatives of imidazoline are selected from the group consisting of acid salts, quaternary ammonium salts, oxyalkylated derivatives and amphoteric derivatives, the formula of said imidazoline being:

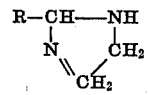

wherein R is an alkyl radical having 8 to 22 carbon atoms.